(12) United States Patent
Schindler et al.

(10) Patent No.: US 12,235,361 B2
(45) Date of Patent: Feb. 25, 2025

(54) ILLUMINATION PATTERN FOR OBJECT DEPTH MEASUREMENT

(71) Applicant: TRINAMIX GMBH, Ludwigshafen am Rhein (DE)

(72) Inventors: Patrick Schindler, Ludwigshafen am Rhein (DE); Peter Schillen, Ludwigshafen am Rhein (DE); Benjamin Rein, Ludwigshafen am Rhein (DE); Christian Lennartz, Ludwigshafen am Rhein (DE); Lars Diesselberg, Kandel (DE); Hamid Muhammed Hamed, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 17/996,791

(22) PCT Filed: Apr. 21, 2021

(86) PCT No.: PCT/EP2021/060347
§ 371 (c)(1),
(2) Date: Oct. 21, 2022

(87) PCT Pub. No.: WO2021/214123
PCT Pub. Date: Oct. 28, 2021

(65) Prior Publication Data
US 2023/0161041 A1    May 25, 2023

(30) Foreign Application Priority Data

Apr. 22, 2020   (EP) .................................... 20170905

(51) Int. Cl.
*G01B 11/02*       (2006.01)
*G01S 7/481*       (2006.01)
(Continued)

(52) U.S. Cl.
CPC ............ *G01S 17/48* (2013.01); *G01B 11/026* (2013.01); *G01S 7/4815* (2013.01); *G01S 17/89* (2013.01)

(58) Field of Classification Search
CPC ........ G01S 17/48; G01S 7/4815; G01S 17/89; G01S 7/4816; G01B 11/026; G01B 11/03; G01B 11/22; G06T 7/50
(Continued)

(56) References Cited

U.S. PATENT DOCUMENTS

2003/0128351 A1* 7/2003 Schmidt ................ G01S 7/4918
                                                         356/4.01
2008/0106746 A1* 5/2008 Shpunt .................... G06T 7/521
                                                         356/610
(Continued)

FOREIGN PATENT DOCUMENTS

EP        2950271 A2   12/2015
WO     2012110924 A1    8/2012
(Continued)

OTHER PUBLICATIONS

X. Jiang, H. Bunke: "Dreidimensionales Computersehen," Chapter 2, Springer, Berlin Heidelberg, 1997.
(Continued)

*Primary Examiner* — Isiaka O Akanbi
(74) *Attorney, Agent, or Firm* — Armstrong Teasdale LLP

(57) ABSTRACT

Disclosed herein is a detector for determining a position of at least one object. The detector includes at least one projector for illuminating the object, at least one sensor element, and at least one evaluation device.

9 Claims, 3 Drawing Sheets

(51) Int. Cl.
*G01S 17/48* (2006.01)
*G01S 17/89* (2020.01)

(58) Field of Classification Search
USPC .................................................. 356/614–626
See application file for complete search history.

(56) References Cited

U.S. PATENT DOCUMENTS

| 2011/0317146 | A1* | 12/2011 | Gu ........................... | G01C 3/10 356/4.03 |
| 2019/0170849 | A1* | 6/2019 | Hermes ................... | G01S 17/06 |
| 2019/0339356 | A1* | 11/2019 | Schildknecht ........ | G01B 11/026 |
| 2020/0348385 | A1* | 11/2020 | Schindler ................. | G06T 7/70 |
| 2022/0092814 | A1* | 3/2022 | Eberspach ................ | G06T 7/74 |
| 2022/0101551 | A1* | 3/2022 | Eberspach ................ | G06T 7/70 |
| 2022/0146250 | A1* | 5/2022 | Bonsignore ............ | G01B 11/03 |

FOREIGN PATENT DOCUMENTS

| WO | 2014097181 A1 | 6/2014 |
| WO | 2014198629 A1 | 12/2014 |
| WO | 2018091638 A1 | 5/2018 |
| WO | 2018091640 A2 | 5/2018 |
| WO | 2018091649 A1 | 5/2018 |
| WO | 2019042956 A1 | 3/2019 |

OTHER PUBLICATIONS

R.A. Street (Ed.): Technology and Applications of Amorphous Silicon, Springer-Verlag Heidelberg, 2010, pp. 346-349.
International Search Report and Written Opinion for corresponding PCT/EP2021/060347 mailed Jul. 2, 2021; 11 pages.

* cited by examiner

ILLUMINATION PATTERN FOR OBJECT DEPTH MEASUREMENT

CROSS-REFERENCE TO RELATED APPLICATIONS

This application is a U.S. National Phase Application of International Patent Application No. PCT/EP2021/060347, filed Apr. 21, 2021, which claims priority to European Patent Application No. 20170905.2, filed Apr. 22, 2020, each of which is hereby incorporated by reference herein.

FIELD OF THE INVENTION

The invention relates to a detector and a method for determining a position of at least one object. The invention further relates to various uses of the detector device. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

The depth-from-photon-ratio (DPR) technique allows reliable distance determination even in case of environment causing multiple reflections, with biasing light sources, or reflective measurement objects with reduced computational demand, in particular with reduced processing power. For example, WO 2018/091640 describes a detector for determining a position of at least one object. The detector comprises: at least one transfer device, wherein the transfer de-vice has at least one focal length in response to at least one incident light beam propagating from the object to the detector; at least two optical sensors, wherein each optical sensor has at least one light sensitive area, wherein each optical sensor is designed to generate at least one sensor signal in response to an illumination of its respective light-sensitive area by the light beam, at least one evaluation device being configured for determining at least one longitudinal coordinate z of the object by evaluating a quotient signal Q from the sensor signals. The detector is adapted to determine the longitudinal coordinate z of the object in at least one measurement range independent from the object size in an object plane.

However, despite the achievements of the DPR technique, technical challenges remain.

For distance determination using the DPR technique a system comprising am mono-camera may be used in combination with a projector which projects a Laser points pattern or grid on a scene. Each point is evaluated and a distance is determined therefrom. The distance determined with DPR technique may provide a distance estimation per Laser point and can be refined by triangulation methods for known positions of camera and projector. In order to calculate the triangulation, the so-called correspondence problem needs to be solved. The correspondence problem describes assignment of a detected laser point and the position of said point in the projected pattern. If this assignment is known, the distance can be determined via triangulation. However, DPR evaluation may be noisy such that the correspondence problem cannot be solved unambiguously for high point densities of the laser point pattern. Specifically, solvability of the correspondence problem may depend on distance of laser points along an epipolar line.

A further challenging problem with DPR technology is that the reflected beam spot area, shape and 2D intensity profile change confusingly if the reflective objects in the imaged scene are unknown. DPR analyzes the response of the reflecting objects when exposed to individual laser beams. This makes the properties of the reflected laser spots, such as area, shape and 2D intensity profile, mainly depend on the reflector. Analyzing the information provided by these properties of a laser spot, helps in identifying the type of material that reflected this spot, and consequently makes is possible to achieve better accuracy when estimating the distance between the reflective object and the image sensor or the laser beams projector. However, various materials positioned at various distances from the image sensor or the laser beams projector might generate almost identical combinations of laser spot properties, and this consequently makes it difficult to identify the material of the reflecting object and to estimate its distance to the projector or camera.

Another challenging problem with the present DPR technique is to estimate the orientation of the reflecting surface.

A further such a challenging problem is the difficulty of analyzing a laser spot that is reflected on a sharp edge, when a part of the laser spot is reflected on one side of this sharp edge and another part of it is reflected on the other side of the edge.

Problem Addressed by the Invention

It is therefore an object of the present invention to provide devices and methods facing the above-mentioned technical challenges of known devices and methods. Specifically, it is an object of the present invention to provide devices and methods using the DPR technique which may determine a position of an object in space, preferably with a low technical effort and with low requirements in terms of technical resources and cost, with enhanced precision.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

In a first aspect of the present invention, a detector for determining a position of at least one object is disclosed.

As used herein, the term "object" refers to an arbitrary object, in particular a surface or region, which is configured to reflect at least partially at least one light beam impinging on the object. The light beam may originate from the projector illuminating the object, wherein the light beam is reflected or scattered by the object.

As used herein, the term "position" refers to at least one item of information regarding a location and/or orientation of the object and/or at least one part of the object in space. Thus, the at least one item of information may imply at least one distance between at least one point of the object and the at least one detector. The distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
  at least one projector for illuminating the object with at least one periodic illumination pattern, wherein the illumination pattern comprises a plurality of illumination features, wherein the illumination features are spatially modulated;
  at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image;
  at least one evaluation device, wherein the evaluation device is configured to select at least one reflection feature of the reflection image, wherein the evaluation device is configured for determining at least one longitudinal coordinate z of the selected reflection feature of the reflection image by using a depth-from-photon-ratio technique by evaluating a combined signal Q from the sensor signals,
wherein the illumination features are patterned illumination features, wherein each of the patterned illumination features comprises a plurality of sub-features, and/or wherein the illumination features are arranged in a periodic pattern equidistant in rows, wherein each of the rows of illumination features have an offset, wherein the offset of neighboring rows differ.

As used herein, the term "projector", also denoted as light projector, refers to an optical device configured to project at least one illumination pattern onto the object, specifically onto a surface of the object. The projector may comprise at least one light source, also denoted illumination device or illumination source, configured for generating at least one light beam. The projector may be configured for generating at least one pattern and for projecting the pattern towards at least one surface or scene comprising the object. The projector may be configured such that the illumination patterns propagate from the projector, in particular from at least one opening of a housing of the projector, towards the object. The projector may be configured for generate and/or to project a cloud of points, for example the projector may comprise at least one digital light processing (DLP) projector, at least one LCoS projector, at least one laser source, at least one array of laser sources; at least one light emitting diode; at least one array of light emitting diodes. Additionally, an additional illumination pattern may be generated by at least one ambient light source.

As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. As used herein, the term "illumination feature" refers to at least one arbitrary shaped feature of the illumination pattern. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector may be configured for generate and/or to project a cloud of points. For example, the projector may be configured for generate a cloud of points such that the illumination pattern may comprise a plurality of point features.

The projector may be configured to generate a plurality of illumination patterns each comprising a plurality of illumination features. The projector may be configured to project two, three, four, five or more illumination patterns each comprising a plurality of illumination features. The illumination patterns may differ, specifically in one or more of: number of illumination features, arrangement of illumination features, shape of illumination features, wavelength of illumination features, intensity of illumination features, opening angle and the like.

The projector may comprise at least one transfer device, in particular at least one diffractive optical element, configured for generate the illumination pattern from at least one light beam generated by the laser source. The term "transfer device", also denoted as "transfer system", may generally refer to one or more optical elements which are configured for modify the light beam, such as by modifying one or more of a beam parameter of the light beam, a width of the light beam or a direction of the light beam. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate l is a coordinate along the optical axis and wherein d is a spatial offset from the optical axis. The coordinate system may be a polar coordinate system in which the optical axis of the transfer de-vice forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light pulse may comprise at least one beam profile. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam may be a Gaussian light beam or a linear combination of Gaussian light beams. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The projector may comprise the at least one transfer device which may be configured for one or more of adjusting, defining and determining the beam profile, in particular a shape of the beam profile.

The illumination features are spatially modulated. As used herein, the term "spatially modulated" may refer to specific and additional spatial arrangement of the illumination features or parts of the illumination feature in comparison to known, regular pattern. The illumination pattern, in particular the spatial arrangement of illumination features, may be designed with respect to a field of view of the sensor element. Specifically, the illumination features are patterned illumination features, wherein each of the patterned illumination features comprises a plurality of sub-features, and/or the illumination features are arranged in a periodic pattern equidistant in rows, wherein each of the rows of illumination features have an offset, wherein the offset of neighboring rows differ.

The illumination features are patterned illumination features. Each of the patterned illumination features comprises a plurality of sub-features. As used herein, the term "pattern illumination feature" may refer to an illumination feature comprising a plurality of elements, denoted sub-features. The sub-features belonging to the same illumination feature may be shaped identical. For example, the illumination feature may comprise a plurality of circles each having a center and a radius. The sub-features belonging to the same illumination feature may be arranged at different spatial positions in the illumination pattern. Specifically, the centers of the sub-features are arranged at different spatial positions in the illumination pattern. The extension of the sub-features may be selected such that they are clearly distinguishable. For example, the patterned illumination feature may be or may comprise a patterned light spot comprising a number of smaller light spots, or a cluster of few smaller light spots, packed densely forming a certain pattern. As used herein, a "light spot" generally refers to a visible or detectable round or non-round illumination of the object by a light beam. Rotated versions such as rotated by 45, 90 or 180 degrees of these patterned illumination features can be used as well. The chosen patterned illumination feature may be replicated such as 1000 to 2000 times to form the illumination pattern. In other words, the projected illumination pattern may comprise e.g. 1000 to 2000 copies of the chosen patterned illumination feature.

For example, the projector may comprise a single light source, in particular a single laser source, configured for generating at least one light beam, also denoted laser beam. The projector may comprise at least one transfer device for diffracting and for replicating the laser beam generated by the single laser source for generating the illumination pattern comprising the patterned illumination features. In particular, the projector comprises the at least one diffractive optical element for diffracting and replicating the light beam. The diffractive optical element may be configured for beam shaping and/or beam splitting. As used herein, the term "replicating" may refer to generating a plurality of light beams from one light beam, in particular multiplying the light beam.

Additionally or alternatively, for example, the projector may comprise at least one array of densely packed light sources, in particular laser sources, according to a certain pattern configured for generating a cluster of light beams. As used herein, the term "densely packed" light sources may refer to a plurality of light sources arranged in a cluster. The density of the light sources may depend on extension of a housing of the individual light sources and distinguishability of the light beams. The projector may comprise the at least one transfer device for diffracting and replicating the cluster of light beams for generating the illumination pattern comprising patterned illumination features.

Additionally or alternatively, the illumination features are arranged in a periodic pattern equidistant in rows. Each of the rows of illumination features has an offset, wherein the offset of neighboring rows differ. As used herein, the term "offset" may refer to a spatial distance between neighboring rows. The sensor element and the projector may be positioned such that the rows run parallel to epipolar lines. The illumination pattern may be selected such that two neighboring illumination features have on an epipolar line a suitable distance. The distance between two illumination features may be such that it is possible to assign unambiguously two points on the epipolar line via depth-from-photon-ratio technique. The suitable distance may depend on distance error of the depth-from-photon-ratio technique and/or from a basis line of the sensor element and the projector.

The illumination features may be arranged as follows. The illumination pattern may comprise a number of rows on which the illumination features are arranged in equidistant positions with distance d. The rows are orthogonal with respect to the epipolar lines. A distance between the rows may be constant. A different offset may be applied to each of the rows in the same direction. The offset may result in that the illumination features of a row are shifted. The offset δ may be δ=a/b, wherein a and b are positive integer numbers such that the illumination pattern is a periodic pattern. For example, δ may be ⅓ or ⅖. The offset and density of illumination features may enhance robustness for solving the correspondence problem.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflected light beams may propagate from the object towards the detector. The projector may illuminate the object with the illumination pattern and the light is reflected or scattered by the object and, thereby, is at least partially directed as reflection light beam towards the detector.

The reflection light beam specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for process or preprocess the sensor signal, thereby generating secondary sensor signals, which may also be used as sensor signals, such as preprocessing by filtering or the like.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

As used herein, the term "reflection image" refers to an image determined by the optical sensor comprising at least one reflection feature. As used herein, the term "reflection feature" refers to a feature in an image plane generated by the object in response to illumination, for example with at least one illumination feature. The reflection image may comprise the at least one reflection pattern comprising the at least one reflection feature. As used herein, the term "determining at least one reflection image" refers to one or more of imaging, recording and generating of the reflection image.

The sensor element may be configured for determine at least one reflection pattern. As used herein, the term "reflection pattern" refers to a response pattern generated by reflection or scattering of light at the surface of the object, in particular generated by the object in response to illumination by the illumination pattern. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device may be configured for select at least one feature of the reflection pattern and to determine the longitudinal region of the selected feature of the reflection pattern by evaluating the combined signal Q from the sensor signals, as described above and in more detail below.

As further used herein, the term "evaluation device" generally refers to an arbitrary device configured for perform the named operations, preferably by using at least one data processing de-vice and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining the at least one longitudinal coordinate of the object, are performed by the at least one evaluation device. Thus, as an example, one or more of the relationships, as will be outlined below, may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

As used herein, the term "select at least one reflection feature" refers to one or more of identifying, determining and choosing at least one reflection feature of the reflection image. The detector may be configured for determine the longitudinal coordinate of an object point for at least one reflection feature of the reflection image from the combined signal. Thus, the detector may be configured for pre-classify the at least one reflection feature of the reflection image and/or to provide a distance estimate for the reflection feature. Specifically, the detector may be configured for determine at least one more accurate distance information of the object by using triangulation and/or structured light techniques considering the pre-classification and/or distance estimate.

The evaluation device may be configured for perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device is configured for determining at least one longitudinal coordinate z of the selected reflection feature of the reflection image by using a depth-from-photon-ratio technique by evaluating a combined signal Q from the sensor signals. The depth-from-photon-ratio technique is generally known to the skilled person such as from WO 2018/091649 A1, WO 2018/091638 A1 and WO 2018/091640 A1, the content of which is included by reference. The technique of determining distance as described in WO 2018/091649 A1, WO 2018/091638 A1 and WO 2018/091640 A1 by using photon ratio is denoted herein "depth-from-photon-ratio" or "beam profile analysis".

As used herein, the term "combined signal Q" refers to a signal which is generated by combining the sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal region for determining the longitudinal region.

For example, the evaluation device may be configured for deriving the combined signal Q by $$Q(z_O) = \frac{\int\int_{A_1} E(x, y; z_O) dx dy}{\int\int_{A_2} E(x, y, z_O) dx dy},$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content.

Generally the beam profile is dependent on luminance $L(z_o)$ and beam shape $S(x,y;z_o)$, $E(x,y;z_o)=L\cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determine the edge information by integrating and/or summing of the first area. The evaluation device may be configured for determine the center information by integrating and/or summing of the second area. For example, the beam profile may be a trapezoid beam profile and the evaluation device may be configured for determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be configured for determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

In one embodiment, the light beam propagating from the object to the detector may illuminate the sensor element with at least one pattern comprising at least one feature point. As used herein, the term "feature point" refers to at least one at least partially extended feature of the pattern. The feature point may be selected from the group consisting of: at least one point, at least one line, at least one edge. The pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

For example, the evaluation device may be configured for evaluating the sensor signals, by
 a) determining at least one optical sensor having the highest sensor signal and forming at least one center signal;
 b) evaluating the sensor signals of the optical sensors of the matrix and forming at least one sum signal;
 c) determining at least one combined signal by combining the center signal and the sum signal; and
 d) determining the at least one longitudinal coordinate z of the selected feature by evaluating the combined signal.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the combined signal Q out of the center signal and the sum signal and by using a predetermined or determinable relationship between the longitudinal coordinate and the quotient signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be configured for determine the center signal by integration of the plurality of sensor signals, for example the plurality of optical sensors around the optical sensor having the highest sensor signal. For example, the beam profile may be a trapezoid beam profile and the evaluation device may be configured for determine an integral of the trapezoid, in particular of a plateau of the trapezoid.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be pre-determined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be configured for determine the sum signal by integrating signals of the entire matrix, or of the region of interest within the matrix. For example, the beam profile may be a trapezoid beam profile and the evaluation device may be configured for determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be configured for determine one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The evaluation device may be configured to determine the at least one longitudinal coordinate z of the object by using at least one known, determinable or predetermined relationship between the sensor signals. In particular, the evaluation device is configured to determine the at least one coordinate z of the object by using at least one known, determinable or predetermined relationship between a quotient signal derived from the sensor signals and the longitudinal coordinate.

Raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The combined signal Q may be determined by using various means. As an example, a software means for deriving the quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element answers or may fully or partially be embodied independent from the sensor element.

Depth measurements using depth-from-photon-ratio technique allow reliable distance determination even in case of environment causing multiple reflections, with biasing light sources, or reflective measurement objects with reduced computational demand, in particular with reduced processing power. The present invention allows identifying material of the reflecting object and to estimate its distance to the projector or sensor element even in the presence of various materials positioned at various distances from the sensor element or if the projector generates almost identical combinations of laser spot properties. Moreover, the present invention allows estimating the orientation of the reflecting surface and edge detection. The illumination pattern comprising spatially modulated illumination features may make at least one property or parameter of the resulted modulated illumination feature more robust against the deformation caused by the physical properties of the materials of the reflecting target objects. This at-least-one property or parameter may depend only on the distance between the reflecting object and the projector or the sensor element. The other properties or parameters of the illumination features may be allowed to be changed and deformed to provide information about the type and the physical properties of the reflecting material and its distance to the projector or the sensor element. As outlined above, the illumination features may be patterned illumination features, wherein each of the patterned illumination features comprises a plurality of sub-features. The illumination feature impinging on the object may illuminate the object. The object may generate, e.g. by reflection, in response to the impinging illumination feature the corresponding reflection feature. The illumination feature is patterned thus, the reflection feature is patterned, too. The evaluation device may be configured for determining information about a distance between the object and the projector and/or the sensor element by analyzing the patterned reflection features of the reflection image. The evaluation device may be configured for finding and segmenting each patterned reflection feature. As used herein, the term "finding" may refer to identifying in the reflection image the reflection feature being generated in response to the corresponding illumination feature. The identifying may comprise performing at least one object recognition algorithm for identifying features in the reflection image. The identifying may further comprise assigning the identified reflection features to the corresponding illumination features. As used herein, the term "segmenting" may refer to a process of partitioning the reflection feature into multiple segments. The segments may correspond to the sub-features of the reflection image being generated in response to the corresponding sub-feature of the illumination feature. The evaluation device may be configured for determining a center of each of the sub-features. The evaluation device may be configured for determining distances between the centers of the sub-features. The evaluation device may be configured for determining the information about the distance between the object and the projector and/or the sensor element from the distances between the centers of the sub-features by using a pre-determined relationship. The evaluation device may be configured for determining a corrected longitudinal coordinate z considering the determined distance between the object and the projector and/or the sensor element. The correct longitudinal coordinate may be a longitudinal coordinate with enhanced accuracy.

The evaluation device may be configured for identifying a material property of the object by speckle contrast estimation within each sub-feature. The evaluation device may be configured for determining a corrected longitudinal coordinate z considering the material property. Specifically, laser spot profile analysis of the depth-from-defocus technique may be combined with speckle contrast estimation or computation within each laser spot to identify the material of the reflecting object and to further estimate its distance to the projector or sensor element, more accurately. Distance determination by using the depth-from-photon-ratio (DPR) technique as described herein is a different technique for determining distances compared to depth-from-defocus. However, the information determined by depth-from-photon-ratio and depth-from-defocus may be combined for even further enhanced distance determination.

The evaluation device may be configured for edge detection. The evaluation device may be configured for determining if the patterned reflection feature was generated by an edge. The illumination feature may comprise at least three sub-features. If said illumination feature impinges on the object, it may generate a reflection feature comprising at least three sub-features corresponding to the sub-features of the illumination feature having generated the reflection feature. The evaluation device may be configured for determining if the sub-features of the reflection feature were generated by a flat reflecting surface of the object or by an edge of the object. The evaluation device may be configured for determining for each of the sub-features a longitudinal coordinate of the object by evaluating a combined signal Q from the sensor signals of the respective sub-feature. The evaluation device may be configured for comparing the longitudinal coordinates of the sub-features. In case the longitudinal coordinates of the sub-features are identical within tolerances, the reflecting surface having generated said sub-features of the reflection feature may be considered as flat. Otherwise the object may be considered to be an edge or to comprise an edge. The evaluation device may be configured for determining normal and local orientation of a reflecting surface of the object from the longitudinal coordinates determined from the sub-features. The evaluation device may be configured for determining a plane spanned by the sub-features. The evaluation device may be configured for determining a surface normal of the plane and/or an orientation of the plane in space. For example, the orientation may be defined by an angle between z-axis, in particular optical axis, and surface normal. Only one patterned illumination feature may be enough to be able to estimate the normal and the local orientation of the reflecting surface, and to know if this patterned laser spot is reflected on an edge or not.

In addition, in the case of problematic reflecting surfaces, the probability to get a usable laser spot reflection is higher when projecting such dense clusters of spots, compared to single spots that are relatively sparsely distributed.

The present invention may allow enhancing performance of the distance and depth measurement using depth-from-photon-ratio technology. This can be done by a simple modification on the hardware side and a simple computationally efficient addition to the currently used algorithm. The resulting detector may get much better performance and can be used for numerous additional applications.

The distance determined with DPR technique may provide a distance estimation per illumination feature and can be refined by triangulation methods for known positions of sensor element and projector. In order to calculate a refined longitudinal coordinate using triangulation, the so-called correspondence problem needs to be solved. In case of using regular patterns, such as a rectangle patterns, it may happen that two neighboring points may be directly neighbors on the epipolar line. For a robust correspondence problem, the physical distance of the features of the pattern may be large such that the point density of the pattern may be low. As outlined above, the present application proposes that the illumination features are arranged in a periodic pattern equidistant in rows, wherein each of the rows of illumination features have an offset, wherein the offset of neighboring rows differ. The offset may allow the reach at a feature density having a large distance on the epilar line and enhanced robustness of the correspondence problem. The selection of difference offsets may be such that the structure of the illumination pattern can be designed with respect to a field of view of the sensor element.

The evaluation device may be configured to determine a longitudinal region of the selected reflection feature by evaluating the combined signal Q, wherein the longitudinal region is given by the longitudinal coordinate z and an error interval ±E. As used herein, the term "longitudinal region" refers to at least one uncertainty interval defined by the longitudinal coordinate z and the measurement uncertainty ±E of the determination of the longitudinal coordinate from the combined signal Q. Error E may depend on measurement uncertainty of the optical sensor. The measurement uncertainty of the optical sensors may be pre-determined and/or estimated and/or may be deposited in at least one data storage unit of the evaluation device. For example, the error interval may be ±10%, preferably ±5%, more preferably ±1%.

The evaluation device may be configured to determine at least one displacement region in at least one reference image corresponding to the longitudinal region. As used herein, the term "reference image" refers to an image different from the reflection image which is determined at a different spatial position compared to the reflection image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device may be configured for determine the at least one reference feature in the at least one reference image corresponding to the at least one reflection feature. As outlined above, the evaluation device may be configured for perform an image analysis and to identify features of the reflection image. The evaluation device may be configured for identify at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen", Springer, Berlin Heidelberg, 1997. Epipolar geometry may assume that the reference image and the reflection image may be images of the object determined at different spatial positions and/or spatial orientations having a fixed distance. The reference image and the reflection image may be images of the object determined at different spatial positions having a fixed distance. The evaluation device may be configured for determine an epipolar line in the reference image. Relative position of the reference image and reflection image may be known. For example, relative position of the reference image and reflection image may be stored within at least one storage unit of the evaluation device. The evaluation device may be configured for determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

As used herein, the term "displacement region" refers to a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. As used herein, the term "reference feature" refers to at least one feature of the reference image. The displacement region may extend along the epipolar line, orthogonal to an epipolar line, or both. The evaluation device may be configured for determine the reference feature along the epipolar line corresponding to the longitudinal coordinate z and to determine an extent of the displacement region along the epipolar line corresponding to the error interval ±ε or orthogonal to an epipolar line. The measurement uncertainty of the distance measurement using the combined signal Q may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extent in an orthogonal direction with respect to the epipolar line or epipolar lines. The evaluation device may determine a displacement region around the image position of the reflection feature. The evaluation device may be configured for determine the longitudinal coordinate z for the reflection feature and an error interval ±ε from the combined signal Q to determine the displacement region along the epipolar line corresponding to z±ε. The evaluation device may be configured for match the selected reflection feature with at least one reference feature within the displacement region. As used herein, the term "matching" refers to determining and/or evaluating corresponding reference and reflection features. The evaluation device may be configured for match the selected feature of the reflection image with the reference feature within the displacement region by using at least one evaluation algorithm considering the determined longitudinal coordinate z. The evaluation algorithm may be a linear scaling algorithm. The evaluation device may be configured for determine the epipolar line closest to and/or within the displacement region. The evaluation device may be configured for determine the epipolar line closest to the image position of the reflection feature. The extent of the displacement region along the epipolar line may be larger than the extent of the displacement region orthogonal to the epipolar line. The evaluation device may be configured for determine an epipolar line before determining a corresponding reference feature. The evaluation device may determine a displacement region around the image position of each reflection feature. The evaluation device may be configured for assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be configured for determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:
  Determining the displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured for decide between more than one epipolar line and/or reference feature to be assigned to a reflection feature such as by comparing distances of reflection features and/or epipolar lines within the reference image and/or by comparing error weighted distances, such as e-weighted distances of reflection features and/or epipolar lines within the reference image and assigning the epipolar line and/or reference feature in shorter distance and/or e-weighted distance to the reference feature and/or reflection feature.

Preferably, the detector may be configured for pre-classify the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line.

The evaluation device may be configured for determine a displacement of a matched reference feature and the selected reflection feature. As used herein, the term "displacement" refers to difference between a position in the reference image to a position in the reflection image. The evaluation device may be configured for determine a longitudinal information of the matched feature using a predetermined relationship between a longitudinal coordinate and the displacement. As used herein, the term "longitudinal information" refers to information relating to the longitudinal coordinate. For example, the longitudinal information may be a distance value. The evaluation device may be configured for determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device may be configured for select, for example subsequent and/or column by column, a reflection feature and to determine for each potential position of the reference feature the corresponding distance value using triangulation. Displacement and corresponding distance value may be stored in at least one storage device of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship. The evaluation device may be configured for store parameters for an intrinsic and/or extrinsic calibration of the camera and/or the detector. The evaluation device may be configured for generate the parameters for an intrinsic and/or extrinsic calibration of the camera and/or the detector such as by performing a Tsai camera calibration. The evaluation device may be configured for compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

Using the combined sensor signal allows to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy and/or speed and/or may lower computational demand in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

For example, the reference image may be an image of the illumination pattern at an image plane at a position of the projector. The evaluation device may be configured for determine the displacement region in the reference image corresponding to the longitudinal region of the selected feature of the reflection pattern. The evaluation device may be configured for match the selected feature of the reflection pattern with at least one feature of the reference pattern within the displacement region. The projector and the sensor element may be separated by a fixed distance.

For example, the detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be configured for determine at least one first reflection pattern, in particular at least one first reflection feature, and the at least one second sensor element may be configured for determine at least one second reflection pattern, in particular at least one second reflection feature. The evaluation device may be configured for select at least one image determined by the first sensor element or the second sensor element as reflection image and to select at least one image determined by the other one of the first sensor element or the second sensor element as reference image. The evaluation device may be configured for select the at least one reflection feature in the reflection pattern and to determine the longitudinal region of the selected feature by evaluating the combined signal Q from the sensor signals. The evaluation device may be configured for determine the displacement region in the reference image corresponding to the longitudinal region of the selected feature of the reflection pattern. The evaluation device may be configured for match the selected feature of the reflection pattern with at least one feature of the reference pattern within the displacement region.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be configured for combine the information of the longitudinal coordinate and the transversal coordinate and to determine a position of the object in space.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:

Illuminating the object with at least one illumination pattern generated by the at least one projector of the detector, wherein the illumination pattern comprises a plurality of illumination features, wherein the illumination features are spatially modulated;

generating for each reflection light beam impinging on the light-sensitive areas of the optical sensors of the sensor element having the matrix of optical sensors at least one sensor signal in response to an illumination;

determining at least one reflection image by using the sensor element;

selecting at least one reflection feature of the reflection image and evaluating the sensor signals by using at least one evaluation device, thereby, determining at least one longitudinal coordinate z of the selected reflection feature, wherein the evaluating comprises evaluating a combined signal Q from the sensor signals.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application. With respect to further uses of the detector and devices of the present invention reference is made to WO 2018/091649 A1, WO 2018/091638 A1 and WO 2018/091640 A1, the content of which is included by reference.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

Overall, in the context of the present invention, the following embodiments are regarded as preferred:

Embodiment 1: A detector for determining a position of at least one object, the detector comprising:
  at least one projector for illuminating the object with at least one illumination pattern, wherein the illumination pattern comprises a plurality of illumination features, wherein the illumination features are spatially modulated;
  at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image;
  at least one evaluation device, wherein the evaluation device is configured to select at least one reflection feature of the reflection image, wherein the evaluation device is configured for determining at least one longitudinal coordinate z of the selected reflection feature of the reflection image by using a depth-from-photon-ratio technique by evaluating a combined signal Q from the sensor signals,
  wherein the illumination features are patterned illumination features, wherein each of the patterned illumination features comprises a plurality of sub-features, and/or wherein the illumination features are arranged in a periodic pattern equidistant in rows, wherein each of the rows of illumination features have an offset, wherein the offset of neighboring rows differ.

Embodiment 2: The detector according to the preceding embodiment, wherein the projector comprises at least one light source configured for generating at least one light beam, wherein the projector comprises at least one transfer device configured for diffracting and for replicating the light beam for generating the illumination pattern comprising patterned illumination features.

Embodiment 3: The detector according to any one of the preceding embodiments, wherein the projector comprises at least one array of densely packed light sources according to a certain pattern configured for generating a cluster of light beams, wherein the projector comprises at least one transfer device for diffracting and replicating the cluster of light beams for generating the illumination pattern comprising patterned illumination features.

Embodiment 4: The detector according to any one of the preceding embodiments, wherein the evaluation device is configured for determining information about a distance between the object and the projector and/or the sensor element by analyzing the patterned reflection features of the reflection image.

Embodiment 5: The detector according to the preceding embodiment, wherein the evaluation de-vice is configured for finding and segmenting each patterned illumination feature, wherein the evaluation device is configured for determining a center of each of the sub-features, wherein the evaluation device is configured for determining distances between the centers of the sub-features, wherein the evaluation device is configured for determining the information about the distance between the object and the projector and/or the sensor element from the distances between the centers of the sub-features by using a pre-determined relationship.

Embodiment 6: The detector according to any one of the two preceding embodiments, wherein the evaluation de-vice is configured for determining a corrected longitudinal coordinate z considering the determined distance between the object and the projector and/or the sensor element.

Embodiment 7: The detector according to any one of the preceding embodiments, wherein the evaluation device is configured for identifying a material property of the object by speckle contrast estimation within each sub-feature, wherein the evaluation device is configured for determining a corrected longitudinal coordinate z considering the material property.

Embodiment 8: The detector according to any one of the preceding embodiments, wherein the evaluation device is configured for edge detection, wherein the illumination feature comprises at least three sub-features, wherein the evaluation device is configured for determining for each of the sub-features a longitudinal coordinate of the object by evaluating a combined signal Q from the sensor signals of the respective sub-feature, wherein the evaluation device is configured for determining normal and local orientation of a reflecting surface of the object from the longitudinal coordinates determined from the sub-features.

Embodiment 9: The detector according to any one of the preceding embodiments, wherein the sensor element and the projector are positioned such that the rows run parallel to epipolar lines.

Embodiment 10: The detector according to any one of the 9 preceding embodiments, wherein the offset δ is $$\delta = \frac{a}{b},$$

wherein a and b are integer numbers.

Embodiment 11: The detector according to any one of the preceding embodiments, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the longitudinal coordinate z for determining the longitudinal coordinate.

Embodiment 12: The detector according to any one of the preceding embodiments, wherein the evaluation device is configured to determine a longitudinal region of the selected reflection feature by evaluating the combined signal Q, wherein the longitudinal region is given by the longitudinal coordinate z and an error interval E, wherein the evaluation device is configured to determine at least one displacement region in at least one reference image corresponding to the longitudinal region, wherein the evaluation device is configured to match the selected reflection feature with at least one reference feature within the displacement region, wherein the evaluation device is configured to determine a displacement of the matched reference feature and the selected reflection feature, wherein the evaluation device is configured to determine a longitudinal information of the matched reference feature using a predetermined relationship between the longitudinal information and the displacement.

Embodiment 13: A method for determining a position of at least one object by using at least one detector according to any one of the preceding embodiments, the method comprising the following steps:

Illuminating the object with at least one illumination pattern generated by the at least one projector of the detector, wherein the illumination pattern comprises a plurality of illumination features, wherein the illumination features are spatially modulated, wherein the illumination features are patterned illumination features, wherein each of the patterned illumination features comprises a plurality of sub-features, and/or wherein the illumination features are arranged in a periodic pattern equidistant in rows, wherein each of the rows of illumination features have an offset, wherein the offset of neighboring rows differ;

generating for each reflection light beam impinging on the light-sensitive areas of the optical sensors of the sensor element having the matrix of optical sensors at least one sensor signal in response to an illumination;

determining at least one reflection image by using the sensor element;

selecting at least one reflection feature of the reflection image and evaluating the sensor signals by using at least one evaluation device, thereby, determining at least one longitudinal coordinate z of the selected reflection feature, wherein the evaluating comprises evaluating a combined signal Q from the sensor signals.

Embodiment 14: A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
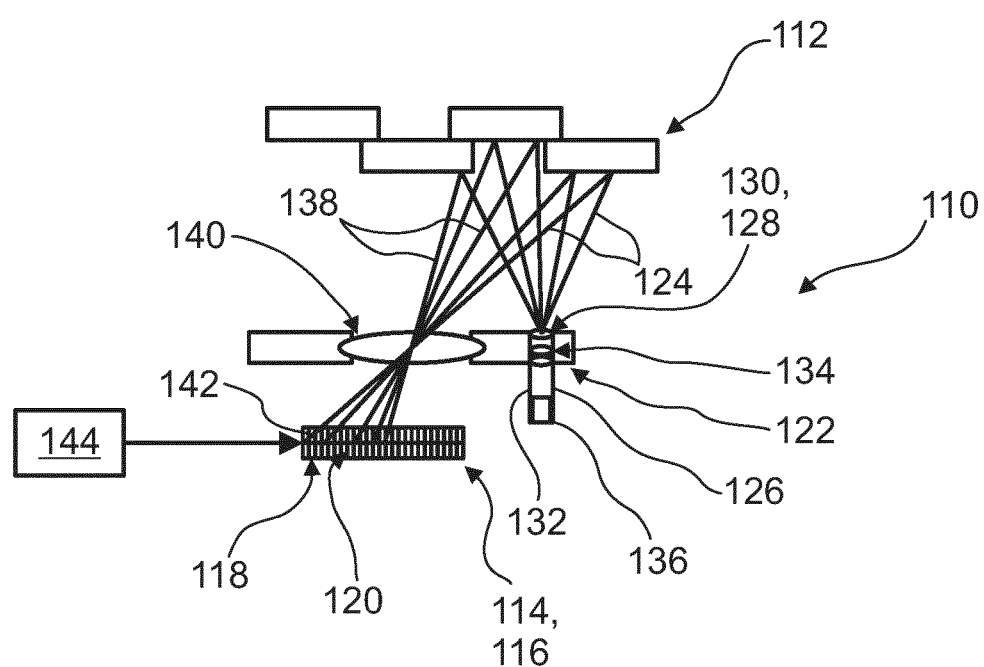
FIG. 1 shows an embodiment of a detector according to the present invention.

FIG. 1 shows in a highly schematic fashion an embodiment of a detector 110 for determining a position of at least one object 112 according to the present invention. The detector 110 comprises at least one sensor element 114 having a matrix 116 of optical sensors 118. The optical sensors 118 each have a light-sensitive area 120.

The sensor element 114 may be formed as a unitary, single device or as a combination of several devices. The matrix 116 specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix 116 may be a single row of pixels. Other arrangements are feasible.

The optical sensors 118 of the matrix 116 specifically may be equal in one or more of size, sensitivity and other optical, electrical and mechanical properties. The light-sensitive areas 120 of all optical sensors 118 of the matrix 116 specifically may be located in a common plane, the common plane preferably facing the object 112, such that a light beam propagating from the object to the detector 110 may generate a light spot on the common plane. The light-sensitive area 120 may specifically be located on a surface of the respective optical sensor 118. Other embodiments, however, are feasible.

The optical sensors 118 may comprise for example, at least one CCD and/or CMOS device. As an example, the optical sensors 118 may be part of or constitute a pixelated optical device. As an example, the optical sensors 118 may be part of or constitute at least one CCD and/or CMOS de-vice having a matrix of pixels, each pixel forming a light-sensitive area 120. Preferably the detector is configured such that the optical sensors 118 are exposed simultaneously within a certain time period, denoted as frame or imaging frame. For example, the optical sensors 118 may be part of or constitute at least one global shutter CMOS.

The optical sensors 118 specifically may be or may comprise photodetectors, preferably inorganic photodetectors, more preferably inorganic semiconductor photodetectors, most preferably silicon photodetectors. Specifically, the optical sensors 118 may be sensitive in the infrared spectral range. All of the optical sensors 118 of the matrix 116 or at least a group of the optical sensors 118 of the matrix 116 specifically may be identical. Groups of identical optical sensors 118 of the matrix 116 specifically may be provided for different spectral ranges, or all optical sensors may be identical in terms of spectral sensitivity. Further, the optical sensors 118 may be identical in size and/or with regard to their electronic or optoelectronic properties. The matrix 116 may be composed of independent optical sensors 118. Thus, a matrix 116 may be composed of inorganic photodiodes. Alternatively, however, a commercially available matrix may be used, such as one or more of a CCD detector, such as a CCD detector chip, and/or a CMOS detector, such as a CMOS detector chip.

The optical sensors 118 may form a sensor array or may be part of a sensor array, such as the above-mentioned matrix. Thus, as an example, the detector 110 may comprise an array of optical sensors 118, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix 116 specifically may be a rectangular matrix having at least one row, preferably a plurality of rows, and a plurality of columns. As an example, the rows and columns may be oriented essentially perpendicular. In order to provide a wide range of view, the matrix 116 specifically may have at least 10 rows, preferably at least 50 rows, more preferably at least 100 rows. Similarly, the matrix may have at least 10 columns, preferably at least 50 columns, more preferably at least 100 columns. The matrix 116 may comprise at least 50 optical sensors 118, preferably at least 100 optical sensors 118, more preferably at least 500 optical sensors 118. The matrix 116 may comprise a number of pixels in a multi-mega pixel range. Other embodiments, however, are feasible.

The detector 110 further comprises a projector 122 for illuminating the object 112 with at least one illumination pattern 124. The projector 122 may comprise at least one laser source 126, in particular for generating at least one light beam. The projector 122 comprises the at least one diffractive optical element 128, in particular for generating and/or forming the illumination pattern 124 from the light beam of the laser source 126. The projector 122 may be configured such that the illumination pattern 124 propagates from the projector 122, in particular from at least one opening 130 of a housing of the projector 122, towards the object 112. The projector 122 may be configured for generate and/or to project a cloud of points, for example the projector 122 may comprise at least one digital light processing (DLP) projector, at least one LCoS projector, at least one laser source, at least one array of laser sources; at least one light emitting diode; at least one array of light emitting diodes. The laser source 126 may comprise focusing optics 134. The projector 122 may comprise a plurality of laser sources 126. Additionally, an additional illumination pattern may be generated by at least one ambient light source.

The projector 122 may comprise at least one control unit 136. The control unit 136 may be configured for controlling the laser source 126. The control unit 136 may comprise at least one processing device, in particular at least one processor and/or at least one application-specific integrated circuit (ASIC). The control unit 136 may comprise one or more programmable devices such as one or more computers, application-specific integrated circuits (ASICs), Digital Signal Processors (DSPs), or Field Programmable Gate Arrays (FPGAs) which are configured to perform the controlling of the laser source 126. The control unit 136 may comprise at least one processing device having a software code stored thereon comprising a number of computer commands. The control unit 136 may provide one or more hardware elements for performing controlling the laser source 126 and/or may provide one or more processors with software running thereon for performing controlling of the laser source. The control unit 136 may be configured to issue and/or to generate at least one electronic signal for controlling the laser source. The control unit 136 may have one or more wireless and/or wire-bound interfaces and/or other types of control connections for controlling the laser source 126. The control unit 136 and the laser source may be interconnected by one or more connectors and/or by one or more interfaces.

The illumination pattern 124 comprises a plurality of illumination features 125. The illumination pattern 124 may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector 122 may be configured for generate and/or to project a cloud of points. For example, the projector 122 may be configured for generate a cloud of points such that the illumination pattern may comprise a plurality of point features.

The illumination features 125 are spatially modulated. The illumination pattern, in particular the spatial arrangement of illumination features 125, may be designed with respect to a field of view of the sensor element 114. Specifically, the illumination features 125 are patterned illumination features 125, wherein each of the patterned illumination features 125 comprises a plurality of sub-features, and/or the illumination features 125 are arranged in a periodic pattern equidistant in rows, wherein each of the rows of illumination features 125 have an offset, wherein the offset of neighboring rows differ.

Figure 2A:
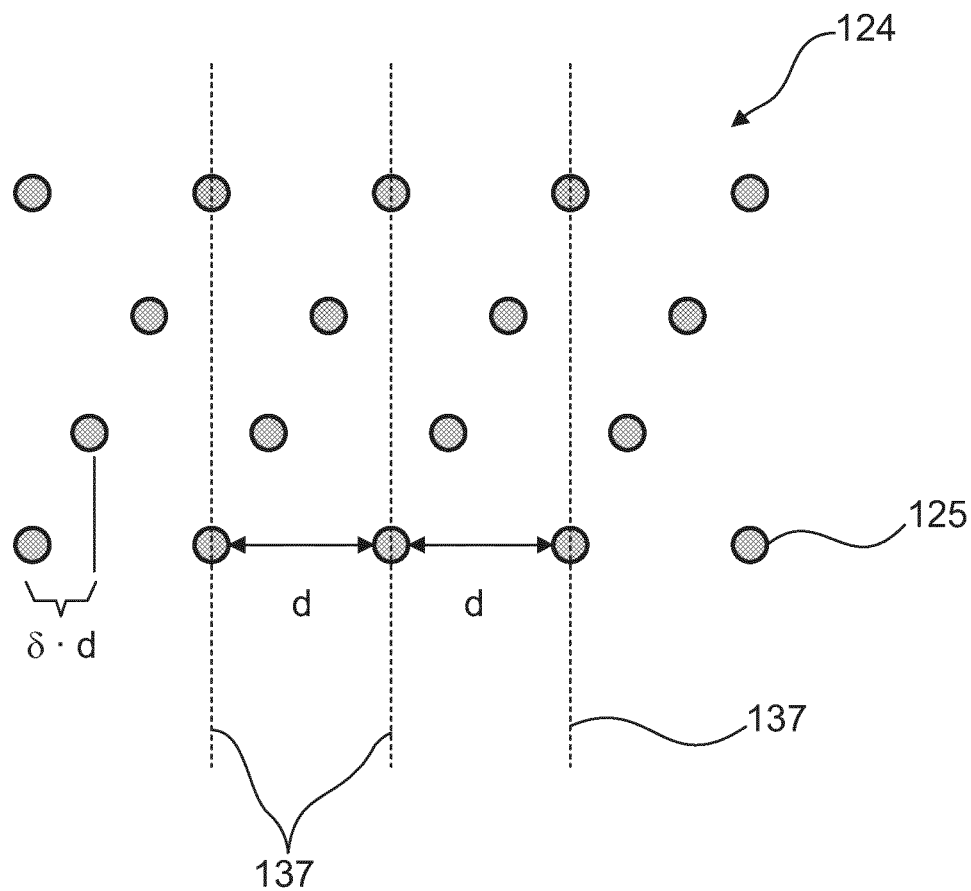
FIGS. 2A and 2B show embodiments of illumination patterns.

As shown in FIG. 2A, the illumination features 125 may be arranged in a periodic pattern equidistant in rows. The distance between neighboring illumination features on a row may be d. Each of the rows of illumination features 125 may have an offset δ, wherein the offset of neighboring rows differ. The offset δ may be a spatial distance between neighboring rows. The sensor element 114 and the projector 122 of FIG. 1 may be positioned such that the rows run parallel to epipolar lines 137. The illumination pattern 124 may be selected such that two neighboring illumination features 125 have on an epipolar line 124 a suitable distance. The distance between two illumination features 125 may be such that it is possible to assign unambiguously two points on the epipolar line 124 via depth-from-photon-ratio technique. The suitable distance may depend on distance error of the depth-from-photon-ratio technique and/or from a basis line of the sensor element 114 and the projector 122.

Figure 2B:
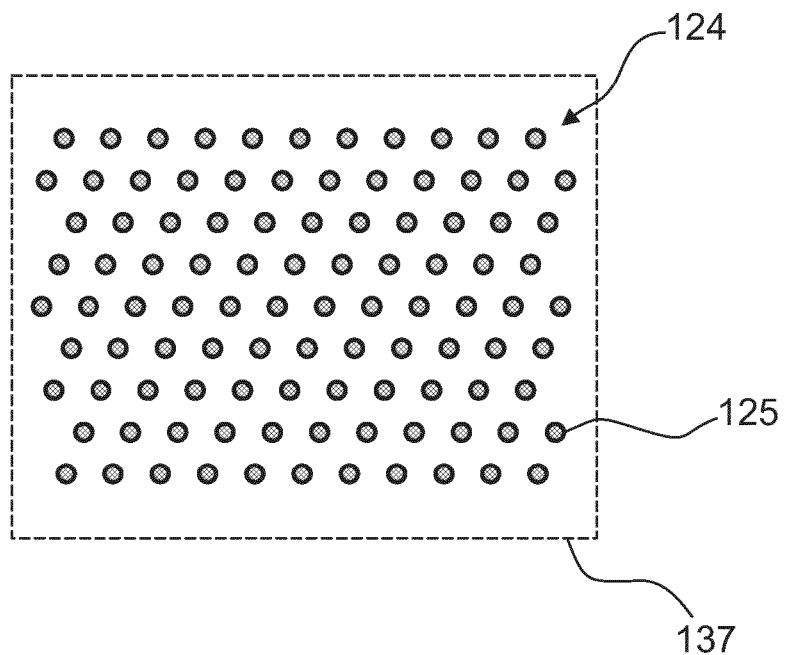

The illumination features 125 may be arranged as follows. The illumination pattern 124 may comprise a number of rows on which the illumination features 125 are arranged in equidistant positions with distance d. The rows are orthogonal with respect to the epipolar lines 137. A distance between the rows may be constant. A different offset may be applied to each of the rows in the same direction. The offset may result in that the illumination features of a row are shifted. The offset δ may be δ=a/b, wherein a and b are positive integer numbers such that the illumination pattern is a periodic pattern. For example, 6 may be ⅓ or ⅔. The so constructed illumination pattern 124 reveals a shifted grid in comparison to the initial regular rectangular pattern. The distance between features on the epipolar lines 137 for this grid arrangement is three times larger compared to the initial regular rectangular pattern. The offset and density of illumination features 125 may enhance robustness for solving the correspondence problem. FIG. 2B shows the illumination pattern 124 in the field of view 139 of the sensor element 114. By using the offset, the illumination features 125 can be arranged such that the illumination pattern 124 matches with the field of view 139 of the sensor element 114.

The illumination features 125 may be patterned illumination features. Each of the patterned illumination features may comprise a plurality of sub-features 141. The sub-features 141 belonging to the same illumination feature 125 may be shaped identical. For example, the illumination feature 125 may comprise a plurality of circles each having a center and a radius. The sub-features 141 belonging to the same illumination feature 125 may be arranged at different spatial positions in the illumination pattern 124. Specifically, the centers of the sub-features 141 are arranged at different spatial positions in the illumination pattern 124. The extension of the sub-features 141 may be selected such that they are clearly distinguishable. For example, the patterned illumination feature 125 may be or may comprise a patterned light spot comprising a number of smaller light spots, or a cluster of few smaller light spots, packed densely forming a certain pattern. Rotated versions such as rotated by 45, 90 or 180 degrees of these patterned illumination features can be used as well. The chosen patterned illumination feature 125 may be replicated such as 1000 to 2000 times to form the illumination pattern 124. In other words, the projected illumination pattern 124 may comprise e.g. 1000 to 2000 copies of the chosen patterned illumination feature 125.

For example, the projector 122 of FIG. 1 may comprise a single light source, in particular a single laser source 126, configured for generating at least one light beam, also denoted laser beam. The projector 122 may comprise the at least one transfer device, in particular the DOE 128, for diffracting and for replicating the laser beam generated by the single laser source for generating the illumination pattern 124 comprising the patterned illumination features. The diffractive optical element 128 may be configured for beam shaping and/or beam splitting.

For example, the projector 122 may comprise at least one array of densely packed light sources, in particular laser sources 126, according to a certain pattern configured for generating a cluster of light beams. The density of the laser sources 126 may depend on extension of a housing of the individual light sources and distinguishability of the light beams. The projector 122 may comprise the at least one transfer device, in particular the DOE 128, for diffracting and replicating the cluster of light beams for generating the illumination pattern 124 comprising patterned illumination features.

Figure 3A:
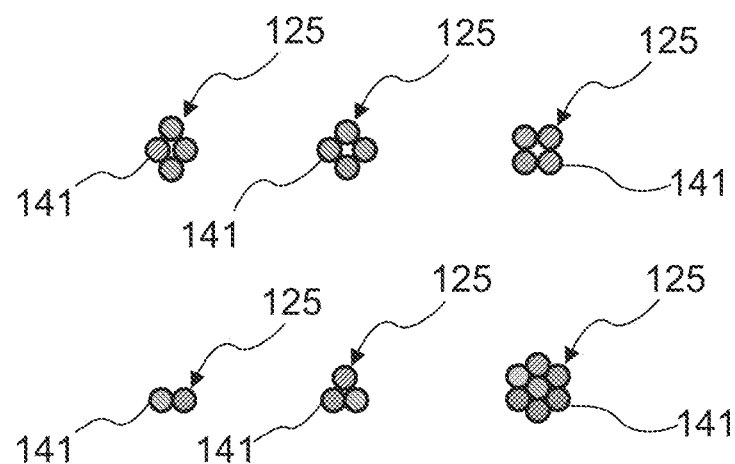
FIGS. 3A and 3B show embodiments of illumination features and a further embodiment of an illumination pattern.
Figure 3B:
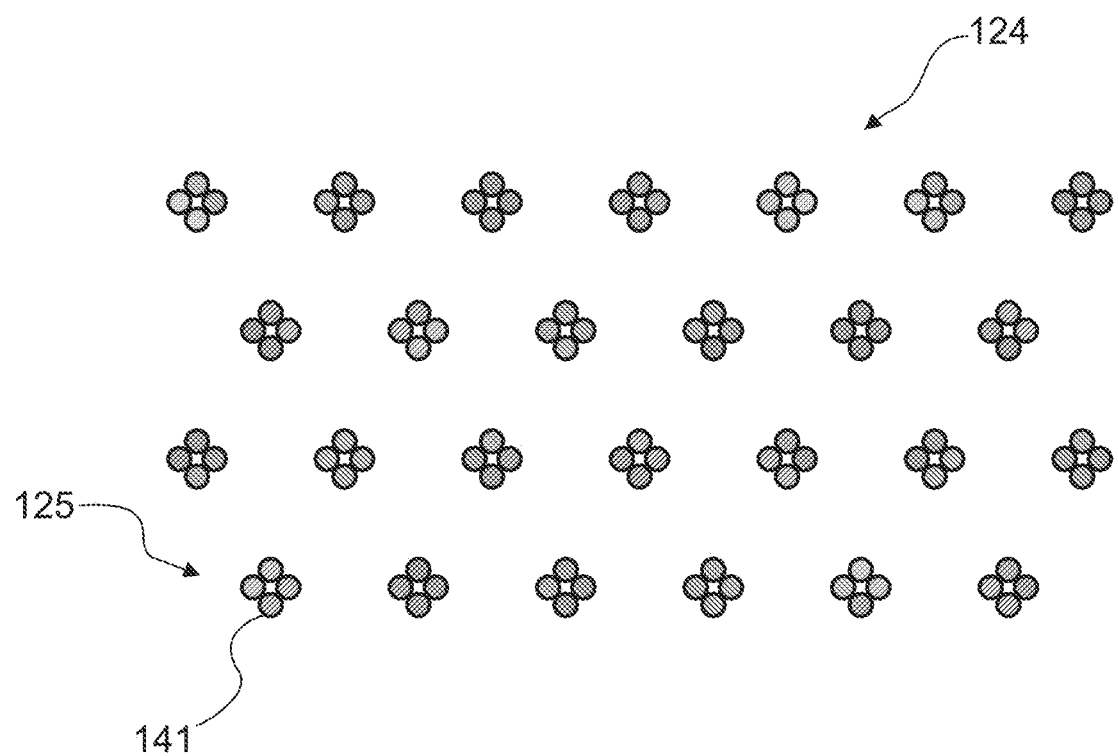

FIG. 3A shows an example of patterned illumination features that can be used to form the illumination pattern 124 that is projected onto the object 112. The illumination features 125 of the upper row comprise four sub-features 141 in different spatial arrangements. In the lower row from left to right, an illumination feature 125 with two sub-features 141, an illumination feature 125 with three sub-features 141 and an illumination feature 125 with seven sub-features 141 are depicted. FIG. 3B shows a projected illumination pattern 124 comprising 26 patterned illumination features 125 with sub-features 142.

In FIG. 1, each optical sensor 118 is designed to generate at least one sensor signal in response to an illumination of its respective light-sensitive area 120 by a reflection light beam propagating from the object 112 to the detector 110. Furthermore, the sensor element 114 is configured to determine at least one reflection image 142 comprising at least one reflection pattern 138. The reflection image 142 may comprise points as reflection features. These points result from reflection light beams originating from the object 112. The sensor element 114 may be configured to determine the reflection pattern 138. The reflection pattern 138 may comprise at least one feature corresponding to at least one illumination feature 125 of the illumination pattern 124. The reflection pattern 138 may comprise, in comparison to the illumination pattern 124, at least one distorted pattern, wherein the distortion depends on the distance of the object 112, such as surface properties of the object 112.

The detector 110 may comprise the at least one transfer device 140 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 140 may comprise at least one collimating lens configured to focus at least one object point in an image plane.

The detector 110 comprises at least one evaluation device 144. The evaluation device 144 is configured to select at least one reflection feature of the reflection image 142. The evaluation device 144 may be configured to select at least one feature of the reflection pattern 138 and to determine the longitudinal coordinate of the selected feature of the reflection pattern by evaluating a combined signal Q from the sensor signals, as described above. Thus, the detector 110 may be configured to pre-classify the at least one reflection feature of the reflection image 142.

The evaluation device 144 may be configured to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors 118.

The evaluation device 144 is configured for determining at least one longitudinal coordinate z of the selected reflection feature of the reflection image 142 by evaluating a combined signal Q from the sensor signals. The evaluation device 144 may be configured for deriving the combined signal Q by one or more of dividing the sensor signals, dividing multiples of the sensor signals, dividing linear combinations of the sensor signals. The evaluation device 144 may be configured for using at least one predetermined relationship between the combined signal Q and the longitudinal region for determining the longitudinal region. For example, the evaluation device 144 may be configured for deriving the combined signal Q by $$Q(z_O) = \frac{\int\int_{A_1} E(x, y; z_O) dx dy}{\int\int_{A_2} E(x, y, z_O) dx dy}$$

wherein x and y are transversal coordinates, A1 and A2 are different areas of at least one beam profile of the reflection light beam at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x,y;z_o)=L \cdot S$. Thus, by deriving the combined signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. The light-sensitive areas 120 may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device 144 may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably, the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1. Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The edge information may comprise information relating to a number of photons in the first area of the beam profile and the center information may comprise information relating to a number of photons in the second area of the beam profile. The evaluation device 144 may be configured for determining an area integral of the beam profile. The evaluation device 144 may be configured to determine the edge information by integrating and/or summing of the first area. The evaluation device 144 may be configured to determine the center information by integrating and/or summing of the second area. For example, the beam profile may be a trapezoid beam profile and the evaluation device may be configured to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device 144 may be configured to determine one or both of center information or edge information from at least one slice or cut of the light spot.

This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

For example, the evaluation device 144 may be configured for evaluating the sensor signals, by
 a) determining at least one optical sensor 118 having the highest sensor signal and forming at least one center signal;
 b) evaluating the sensor signals of the optical sensors 118 of the matrix 116 and forming at least one sum signal;
 c) determining at least one combined signal by combining the center signal and the sum signal; and
 d) determining the at least one longitudinal coordinate z of the selected feature by evaluating the combined signal.

For example, the center signal may be the signal of the at least one optical sensor 116 having the highest sensor signal out of the plurality of sensor signals generated by the optical sensors 118 of the entire matrix 116 or of a region of interest within the matrix 116, wherein the region of interest may be predetermined or determinable within an image generated by the optical sensors of the matrix 116. The center signal may arise from a single optical sensor 118 or from a group of optical sensors 118, wherein, in the latter case, as an example, the sensor signals of the group of optical sensors 118 may be added up, integrated or averaged, in order to determine the center signal. The group of optical sensors 118 from which the center signal arises may be a group of neighboring optical sensors, such as optical sensors 118 having less than a predetermined distance from the actual optical sensor having the highest sensor signal, or may be a group of optical sensors generating sensor signals being within a predetermined range from the highest sensor signal. The group of optical sensors 118 from which the center signal arises may be chosen as large as possible in order to allow maximum dynamic range. The evaluation device 144 may be configured to determine the center signal by integration of the plurality of sensor signals, for example the plurality of optical sensors around the optical sensor having the highest sensor signal.

The determination of the center signal may be performed electronically, since a comparison of sensor signals is fairly simply implemented by conventional electronics, or may be performed fully or partially by software. The detection of the center of the light spot, i.e. the detection of the center signal and/or of the at least one optical sensor from which the center signal arises, may be performed fully or partially electronically or fully or partially by using one or more software algorithms. Specifically, the evaluation device 144 may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

Specifically, the center signal may be selected from the group consisting of: the highest sensor signal; an average of a group of sensor signals being within a predetermined range of tolerance from the highest sensor signal; an average of sensor signals from a group of optical sensors containing the optical sensor 118 having the highest sensor signal and a predetermined group of neighboring optical sensors 118; a sum of sensor signals from a group of optical sensors 118 containing the optical sensor 118 having the highest sensor signal and a predetermined group of neighboring optical sensors 118; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors 118 containing the optical sensor 118 having the highest sensor signal and a predetermined group of neighboring optical sensors; an integral of a group of sensor signals being within a predetermined range of tolerance from the highest sensor signal; an integral of a group of sensor signals being above a predetermined threshold.

For example, the sum signal may be derived by adding up the sensor signals, integrating over the sensor signals or averaging over the sensor signals of the entire matrix 116 or of a region of interest within the matrix, wherein the region of interest may be predetermined or determinable within an image generated by the optical sensors 118 of the matrix 116. When adding up, integrating over or averaging over the sensor signals, the actual optical sensors 118 from which the sensor signal is generated may be left out of the adding, integration or averaging or, alternatively, may be included into the adding, integration or averaging. The evaluation device 144 may be configured to determine the sum signal by integrating signals of the entire matrix 116, or of the region of interest within the matrix 116. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

The sum signal may be derived from all sensor signals of the matrix 116, from the sensor signals within a region of interest or from one of these possibilities with the sensor signals arising from the optical sensors 118 contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix 116; a sum of all sensor signals of the matrix 116; an integral of all sensor signals of the matrix 116; an average over all sensor signals of the matrix 116 except for sensor signals from those optical sensors 118 contributing to the center signal; a sum of all sensor signals of the matrix 116 except for sensor signals from those optical sensors 118 contributing to the center signal; an integral of all sensor signals of the matrix 116 except for sensor signals from those optical sensors 118 contributing to the center signal; a sum of sensor signals of optical sensors 118 within a predetermined range from the optical sensor having the highest sensor signal; an integral of sensor signals of optical sensors within a predetermined range from the optical sensor 118 having the highest sensor signal; a sum of sensor signals above a certain threshold of optical sensors being located within a predetermined range from the optical sensor 118 having the highest sensor signal; an integral of sensor signals above a certain threshold of optical sensors 118 being located within a predetermined range from the optical sensor 118 having the highest sensor signal. Other options, however, exist. The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device 144 may comprise at least one summing device for forming the sum signal. The summing device may fully or partially be integrated into the sensor element or may fully or partially be embodied independently from the sensor element. The summing device may fully or partially be embodied in one or both of hardware or software.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal. The evaluation device 144 may be configured to determine the at least one longitudinal coordinate z of the object by using at least one known, determinable or predetermined relationship between the sensor signals. In particular, the evaluation device 144 may be configured to determine the at least one coordinate z of the by using at least one known, determinable or predetermined relationship between a quotient signal derived from the sensor signals and the longitudinal coordinate.

The comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device 144 may be configured for forming the one or more quotient signals. The evaluation device 144 may further be configured for determining the at least one longitudinal coordinate by evaluating the at least one quotient signal.

The evaluation device 144 specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot.

Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The evaluation device 144 may be configured for using at least one predetermined relationship between the combined signal and the longitudinal coordinate. The predetermined relationship may be one or more of an empiric relationship, a semi-empiric relationship and an analytically derived relationship. The evaluation device 144 may comprise at least one data storage device for storing the predetermined relationship, such as a lookup list or a lookup table.

Depth measurements using depth-from-photon-ratio technique allow reliable distance determination even in case of environment causing multiple reflections, with biasing light sources, or reflective measurement objects with reduced computational demand, in particular with reduced processing power. The present invention allows identifying material of the reflecting object and to estimate its distance to the projector 122 or sensor element 114 even in the presence of various materials positioned at various distances from the sensor element 114 or if the projector 122 generates almost identical combinations of laser spot properties. Moreover, the present invention allows estimating the orientation of the reflecting surface and edge detection. The illumination pattern 124 comprising spatially modulated illumination features 125 may make at least one property or parameter of the resulted modulated illumination feature more robust against the deformation caused by the physical properties of the materials of the reflecting target objects. This at-least-one property or parameter may depend only on the distance between the reflecting object 112 and the projector 122 or the sensor element 114. The other properties or parameters of the illumination features 125 may be allowed to be changed and deformed to provide information about the type and the physical properties of the reflecting material and its distance to the projector 122 or the sensor element 114. As outlined above, the illumination features 125 may be patterned illumination features, wherein each of the patterned illumination features 125 comprises a plurality of sub-features 141. The evaluation device 144 may be configured for determining information about a distance between the object 112 and the projector 122 and/or the sensor element 114 by analyzing the patterned reflection features of the reflection image 142. The evaluation device 144 may be configured for finding and segmenting each patterned illumination feature. The evaluation device 144 may be configured for determining a center of each of the sub-features. The evaluation device 144 may be configured for determining distances between the centers of the sub-features 141. The evaluation device 144 may be configured for determining the information about the distance between the object 112 and the projector 122 and/or the sensor element 114 from the distances between the centers of the sub-features 141 by using a pre-determined relationship. The evaluation device 144 may be configured for determining a corrected longitudinal coordinate z considering the determined distance between the object 112 and the projector 122 and/or the sensor element 114. The correct longitudinal coordinate may be a longitudinal coordinate with enhanced accuracy.

The evaluation device 144 may be configured for edge detection. The illumination feature 125 may comprise at least three sub-features 141. The evaluation device 144 may be configured for determining for each of the sub-features 141 a longitudinal coordinate of the object 112 by evaluating a combined signal Q from the sensor signals of the respective sub-feature 141. The evaluation device 144 may be configured for determining normal and local orientation of a reflecting surface of the object 112 from the longitudinal coordinates determined from the sub-features 141. Only one patterned illumination feature may be enough to be able to estimate the normal and the local orientation of the reflecting surface, and to know if this patterned laser spot is reflected on an edge or not.

In addition, in the case of problematic reflecting surfaces, the probability to get a usable laser spot reflection is higher when projecting such dense clusters of spots, compared to single spots that are relatively sparsely distributed.

The present invention may allow enhancing performance of the distance and depth measurement using depth-from-photon-ratio technology. This can be done by a simple modification on the hardware side and a simple computationally efficient addition to the currently used algorithm. The resulting detector 110 may get much better performance and can be used for numerous additional applications.

The distance determined with DPR technique may provide a distance estimation per illumination feature and can be refined by triangulation methods for known positions of sensor element 114 and projector 122. In order to calculate a refined longitudinal coordinate using triangulation, the so-called correspondence problem needs to be solved. In case of using regular patterns, such as a rectangle patterns, it may happen that two neighboring points may be directly neighbors on the epipolar line. For a robust correspondence problem, the physical distance of the features of the pattern may be large such that the point density of the pattern may be low. As outlined above, the present application proposes that the illumination features 125 are arranged in a periodic pattern equidistant in rows, wherein each of the rows of illumination features have an offset, wherein the offset of neighboring rows differ. The offset may allow the reach at a feature density having a large distance on the epilolar line and enhanced robustness of the correspondence problem. The selection of difference offsets may be such that the structure of the illumination pattern 124 can be designed with respect to a field of view of the sensor element 114.

The evaluation device 144 may be configured to determine a longitudinal region of the selected reflection feature by evaluating the combined signal Q, wherein the longitudinal region is given by the longitudinal coordinate z and an error interval $\pm\varepsilon$. Error $\varepsilon$ may depend on measurement uncertainty of the optical sensor 118. The measurement uncertainty of the optical sensors 118 may be pre-determined and/or estimated and/or may be deposited in at least one data storage unit of the evaluation device 144. For example, the error interval may be $\pm 10\%$, preferably $\pm 5\%$, more preferably $\pm 1\%$.

The evaluation device 144 may be configured to determine at least one displacement region in at least one reference image corresponding to the longitudinal region. The reference image may be an image different from the reflection image which is determined at a different spatial position compared to the reflection image 142. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device 144 may be configured to determine the at least one reference feature in the at least one reference image corresponding to the at least one reflection feature. The evaluation device 144 may be configured to perform an image analysis and to identify features of the reflection image 142. The evaluation device 144 may be configured to identify at least one reference feature in the reference image having an essentially identical longitudinal coordinate as the selected reflection feature. The reference feature corresponding to the reflection feature may be determined using epipolar geometry. For description of epipolar geometry reference is made, for example, to chapter 2 in X. Jiang, H.

Bunke: "Dreidimensionales Computersehen" Springer, Berlin Heidelberg, 1997. Epipolar geometry may assume that the reference image and the reflection image 142 may be images of the object determined at different spatial positions and/or spatial orientations having a fixed distance. The reference image and the reflection image 142 may be images of the object 112 determined at different spatial positions having a fixed distance. The evaluation device 144 may be configured to determine an epipolar line 137 in the reference image. Relative position of the reference image and reflection image may be known. For example, relative position of the reference image and reflection image 142 may be stored within at least one storage unit of the evaluation device 144. The evaluation device 144 may be configured to determine a straight line extending from the selected reflection feature of the reflection image 142. The straight line may comprise possible object features corresponding to the selected feature. The straight line and the baseline span an epipolar plane. As the reference image is determined at a different relative position from the reflection image, the corresponding possible object features may be imaged on a straight line, called epipolar line 137, in the reference image. Thus, a feature of the reference image corresponding to the selected feature of the reflection image lies on the epipolar line 137. Due to distortions of the image or changes in the system parameters such as due to ageing, temperature changes, mechanical stress or the like, epipolar lines 137 may intersect or be very close to each other and/or the correspondence between reference feature and reflection feature may be unclear. Further, each known position or object in the real world may be projected onto the reference image and vice versa. The projection may be known due to a calibration of the detector 110, whereas the calibration is comparable to a teach-in of the epipolar geometry of the specific camera.

Specifically, the displacement region may be a region in the reference image in which the reference feature corresponding to the selected reflection feature is expected to be located in the reference image. Depending on the distance to the object 112, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line 137 or a section of an epipolar line 137. The displacement region may comprise more than one epipolar line 137 or more sections of more than one epipolar line 137. The displacement region may extend along the epipolar line 137, orthogonal to an epipolar line 137, or both. The evaluation device 144 may be configured to determine the reference feature along the epipolar line corresponding to the longitudinal coordinate z and to determine an extent of the displacement region along the epipolar line 137 corresponding to the error interval ±ε or orthogonal to an epipolar line 137. The measurement uncertainty of the distance measurement using the combined signal Q may result in a displacement region which is non-circular since the measurement uncertainty may be different for different directions. Specifically, the measurement uncertainty along the epipolar line 137 or epipolar lines 137 may be greater than the measurement uncertainty in an orthogonal direction with respect to the epipolar line 137 or epipolar lines 137. The displacement region may comprise an extent in an orthogonal direction with respect to the epipolar line 137 or epipolar lines 137. The evaluation device may determine a displacement region around the image position of the reflection feature. The evaluation device 144 may be configured to determine the longitudinal coordinate z for the reflection feature and an error interval ±ε from the combined signal Q to determine the displacement region along the epipolar line 137 corresponding to z±ε. The evaluation device may be configured to match the selected reflection feature with at least one reference feature within the displacement region. The matching may comprise determining and/or evaluating corresponding reference and reflection features. The evaluation device 144 may be configured to match the selected feature of the reflection image with the reference feature within the displacement region by using at least one evaluation algorithm considering the determined longitudinal coordinate z. The evaluation algorithm may be a linear scaling algorithm. The evaluation device 144 may be configured to determine the epipolar line 137 closest to and/or within the displacement region. The evaluation device 144 may be configured to determine the epipolar line 137 closest to the image position of the reflection feature. The extent of the displacement region along the epipolar line 137 may be larger than the extent of the displacement region orthogonal to the epipolar line 137. The evaluation device 144 may be configured to determine an epipolar line 137 before determining a corresponding reference feature. The evaluation device 144 may determine a displacement region around the image position of each reflection feature. The evaluation device 144 may be configured to assign an epipolar line 137 to each displacement region of each image position of the reflection features, such as by assigning the epipolar line 137 closest to a displacement region and/or within a displacement region and/or closest to a displacement region along a direction orthogonal to the epipolar line 137. The evaluation device 144 may be configured to determine the reference feature corresponding to the image position of the reflection feature by determining the reference feature closest to the assigned displacement region and/or within the assigned displacement region and/or closest to the assigned displacement region along the assigned epipolar line 137 and/or within the assigned displacement region along the assigned epipolar line 137.

Additionally or alternatively, the evaluation device 144 may be configured to perform the following steps:

Determining the displacement region for the image position of each reflection feature;

Assigning an epipolar line 137 to the displacement region of each reflection feature such as by assigning the epipolar line 137 closest to a displacement region and/or within a displacement region and/or closest to a displacement region along a direction orthogonal to the epipolar line 137;

Assigning and/or determining at least one reference feature to each reflection feature such as by assigning the reference feature closest to the assigned displacement region and/or within the assigned displacement region and/or closest to the assigned displacement region along the assigned epipolar line 137 and/or within the assigned displacement region along the assigned epipolar line 137.

Additionally or alternatively, the evaluation device 144 may be configured to decide between more than one epipolar line 137 and/or reference feature to be assigned to a reflection feature such as by comparing distances of reflection features and/or epipolar lines 137 within the reference image and/or by comparing error weighted distances, such as ε-weighted distances of reflection features and/or epipolar lines 137 within the reference image and assigning the epipolar line 137 and/or reference feature in shorter distance and/or e-weighted distance to the reference feature and/or reflection feature.

Preferably, the detector 110 may be configured to pre-classify the selected reflection feature using the combined signal Q such that an unambiguous assignment to one reference feature is possible. In particular, illumination features 125 of the illumination pattern 124 may be arranged such that corresponding reference features of the reference image may have a relative distance to each other as large as possible on the epipolar line.

The evaluation device 144 may be configured to determine a displacement of the matched reference feature and the selected reflection feature. The evaluation device 144 may be configured to determine a longitudinal information of the matched feature using a predetermined relationship between a longitudinal coordinate and the displacement. For example, the longitudinal information may be a distance value. The evaluation device 144 may be configured to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device 144 may be configured to select, for example subsequent and/or column by column, a reflection feature and to determine for each potential position of the reference feature the corresponding distance value using triangulation. Displacement and corresponding distance value may be stored in at least one storage device of the evaluation device 144. The evaluation device 144 may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage de-vice may be provided, such as for providing one or more look-up tables for storing the predetermined relationship. The evaluation device 144 may be configured to store parameters for an intrinsic and/or extrinsic calibration of the camera and/or the detector 110. The evaluation device 144 may be configured to generate the parameters for an intrinsic and/or extrinsic calibration of the camera and/or the detector such as by performing a Tsai camera calibration. The evaluation device 144 may be configured to compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

Using the combined sensor signal allows to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy and/or speed and/or may lower computational demand in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device 144 such as in a mobile application.

LIST OF REFERENCE NUMBERS 110 detector
112 object
114 sensor element
116 matrix
118 optical sensor
120 light-sensitive area
122 projector
124 illumination pattern
125 illumination feature
126 laser source
128 DOE
130 opening
132 housing
134 optics
136 control unit
137 epipolar line
138 reflection pattern
139 field of view
140 transfer device
141 sub-feature
142 reflection image
144 evaluation device

The invention claimed is:

1. A detector for determining a position of at least one object, the detector comprising:
   at least one projector for illuminating the object with at least one illumination pattern, wherein the illumination pattern comprises a plurality of illumination features, wherein the illumination features are spatially modulated such that the illumination features are patterned illumination features;
   at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is configured to determine at least one reflection image;

at least one evaluation device, wherein the evaluation device is configured to select at least one reflection feature of the reflection image, wherein the reflection feature is a feature in an image plane generated by the object in response to illumination by at least one illumination feature, wherein the evaluation device is configured for determining at least one longitudinal coordinate z of the selected reflection feature of the reflection image by using a depth-from-photon-ratio technique by evaluating a combined signal Q from the sensor signals, wherein the combined signal Q is a signal which is generated by combining the sensor signals, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the longitudinal region for determining the longitudinal region, wherein each of the patterned illumination features comprises a plurality of sub-features, and wherein the illumination features are arranged in a periodic pattern equidistant in rows, wherein each of the rows of illumination features have an offset in the same direction, wherein the offset of neighboring rows differ, wherein the offset δ is $$\delta = \frac{a}{b},$$

wherein a and b are integer numbers such that the illumination pattern is a periodic pattern, wherein the evaluation device is configured for determining information about a distance between the object and the projector by analyzing the patterned reflection features of the reflection image wherein the evaluation device is configured for finding and segmenting each patterned reflection feature, wherein the evaluation device is configured for determining a center of each of the sub-features, wherein the evaluation device is configured for determining distances between the centers of the sub-features, wherein the evaluation device is configured for determining the information about the distance between the object and the projector from the distances between the centers of the sub-features by using a pre-determined relationship, and wherein the evaluation device is configured for edge detection, wherein the plurality of sub-features comprises at least three sub-features, wherein the evaluation device is configured for determining for each of the sub-features a longitudinal coordinate of the object by evaluating a combined signal Q from the sensor signals of the respective sub-feature, wherein the evaluation device is configured for determining normal and local orientation of a reflecting surface of the object from the longitudinal coordinates determined from the sub-features.

2. The detector according to claim 1, wherein the projector comprises at least one light source configured for generating at least one light beam, wherein the projector comprises at least one transfer device configured for diffracting and for replicating the light beam for generating the illumination pattern comprising patterned illumination features.

3. The detector according to claim 1, wherein the projector comprises at least one array of densely packed light sources according to a certain pattern configured for generating a cluster of light beams, wherein the projector comprises at least one transfer device for diffracting and replicating the cluster of light beams for generating the illumination pattern comprising patterned illumination features.

4. The detector according to claim 1, wherein the evaluation device is configured for determining a corrected longitudinal coordinate z considering the determined distance between the object and the projector.

5. The detector according to claim 1, wherein the sensor element and the projector are positioned such that the rows run parallel to epipolar lines.

6. The detector according to claim 1, wherein the evaluation device is configured to determine a longitudinal region of the selected reflection feature by evaluating the combined signal Q, wherein the longitudinal region is given by the longitudinal coordinate z and an error interval ±ε, wherein the evaluation device is configured to determine at least one displacement region in at least one reference image corresponding to the longitudinal region, wherein the reference image is an image different from the reflection image which is determined at a different spatial position compared to the reflection image, wherein the evaluation device is configured to match the selected reflection feature with at least one reference feature within the displacement region, wherein the evaluation device is configured to determine a displacement of the matched reference feature and the selected reflection feature, wherein the evaluation device is configured to determine a longitudinal information of the matched reference feature using a predetermined relationship between the longitudinal information and the displacement.

7. A method for determining a position of at least one object by using at least one detector according to claim 1, the method comprising the following steps:

illuminating the object with at least one illumination pattern generated by the at least one projector of the detector, wherein the illumination pattern comprises a plurality of illumination features, wherein the illumination features are spatially modulated, wherein the illumination features are patterned illumination features, wherein each of the patterned illumination features comprises a plurality of sub-features, wherein the plurality of sub-features comprises at least three sub-features, and wherein the illumination features are arranged in a periodic pattern equidistant in rows, wherein each of the rows of illumination features have an offset in the same direction, wherein the offset of neighboring rows differ, wherein the offset δ is $$\delta = \frac{a}{b},$$

wherein a and b are integer numbers such that the illumination pattern is a periodic pattern;

determining information about a distance between the object and the projector by analyzing the patterned reflection features of the reflection image, finding and segmenting each patterned reflection feature, determining a center of each of the sub-features, determining distances between the centers of the sub-features, and determining the information about the distance between the object and the projector from the distances between the centers of the sub-features by using a pre-determined relationship;

detecting an edge by determining for each of the sub-features a longitudinal coordinate of the object by evaluating a combined signal Q from the sensor signals of the respective sub-feature and determining normal and local orientation of a reflecting surface of the object from the longitudinal coordinates determined from the sub-features;

generating for each reflection light beam impinging on the light-sensitive areas of the optical sensors of the sensor element having the matrix of optical sensors at least one sensor signal in response to an illumination;

determining at least one reflection image by using the sensor element; and selecting at least one reflection feature of the reflection image and evaluating the sensor signals by using at least one evaluation device, thereby, determining at least one longitudinal coordinate z of the selected reflection feature, wherein the evaluating comprises evaluating a combined signal Q from the sensor signals.

8. A method of using the detector according to claim 1, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; and a manufacturing application.

9. The detector according to claim 1, wherein a distance between two illumination features is such that it is possible to unambiguously assign two points on the epipolar line via depth-from-photon-ratio technique.

* * * * *